United States Patent
Goudey et al.

(10) Patent No.: US 11,604,841 B2
(45) Date of Patent: Mar. 14, 2023

(54) MECHANISTIC MATHEMATICAL MODEL SEARCH ENGINE

(71) Applicant: International Business Machines Corporation, Armonk, NY (US)

(72) Inventors: Benjamin W. Goudey, East Melbourne (AU); Chathurika K H Hettiarachchige, Carlton North (AU); Roslyn I. Hickson, Fitzroy North (AU); Annalisa J. Swan, Brunswick East (AU)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 15/848,447

(22) Filed: Dec. 20, 2017

(65) Prior Publication Data

US 2019/0188321 A1 Jun. 20, 2019

(51) Int. Cl.
*G06F 16/951* (2019.01)
*G06F 17/10* (2006.01)
(Continued)

(52) U.S. Cl.
CPC ............ *G06F 16/951* (2019.01); *G06F 17/10* (2013.01); *G06F 30/20* (2020.01); *G06F 2111/10* (2020.01)

(58) Field of Classification Search
CPC .... G06F 17/5009; G06F 17/10; G06F 40/205; G06F 16/24575; G06F 16/5866;
(Continued)

(56) References Cited

U.S. PATENT DOCUMENTS 5,930,154 A * 7/1999 Thalhammer-Reyero ...................
G05B 17/02
703/11
8,412,703 B2 4/2013 Yu
(Continued)

FOREIGN PATENT DOCUMENTS

| JP | 2016524766 A | 8/2016 |
|---|---|---|
| WO | 2007149623 A2 | 12/2007 |
| WO | 2010055967 A1 | 5/2010 |

OTHER PUBLICATIONS

Cleverland et al. "Introduction to indexing and Abstracting", ABC-CLIO, LLC (Year: 2013).*
(Continued)

*Primary Examiner* — Yuk Ting Choi
(74) *Attorney, Agent, or Firm* — Brian M. Restauro

(57) ABSTRACT

A system, method and program product for a mechanistic model search engine. A system is disclosed having: a search interface for receiving input including text and functions relating to mechanistic models; a source interface for crawling online sources for mechanistic model information, wherein the information sources include text, tables, graphs, and functions; a context analysis system that determines parameter-based details from text information; a parameter processing system that derives parameter-based details from functions; and a search algorithm that compares parameter-based details determined from the input against parameter-based details determined from the information sources to identify mechanistic model search results.

17 Claims, 7 Drawing Sheets

(51) Int. Cl.
*G06F 30/20* (2020.01)
*G06F 111/10* (2020.01)

(58) Field of Classification Search
CPC .... G06F 30/27; G06F 3/04842; G06F 16/287;
G06F 3/0482; G06F 16/26; G06F 16/248;
G06F 16/367; G06F 16/217; G06F
16/24553; G06F 16/951; G06F 30/20;
G06F 2111/10; G06N 20/00; G06N
5/025; G06N 5/022; G06N 3/08; G06N
7/005; G06N 7/00
See application file for complete search history.

(56) References Cited

U.S. PATENT DOCUMENTS

| | | | |
|---|---|---|---|
| 8,442,940 B1* | 5/2013 | Faletti | G06F 40/40 707/610 |
| 9,406,037 B1 | 8/2016 | Papakonstantinou et al. | |
| 9,575,952 B2 | 2/2017 | Kumar Rangarajan Sridhar | |
| 9,633,140 B2 | 4/2017 | Lai et al. | |
| 2002/0194158 A1* | 12/2002 | Stensmo | G06F 16/3346 707/999.002 |
| 2006/0212441 A1 | 9/2006 | Tang et al. | |
| 2011/0282861 A1* | 11/2011 | Bergstraesser | G06F 16/24564 707/710 |
| 2013/0080888 A1* | 3/2013 | Audet | G06F 3/04817 715/277 |
| 2013/0124515 A1 | 5/2013 | Ghimire | |
| 2014/0303949 A1* | 10/2014 | Boneti | G06F 17/5009 703/6 |
| 2015/0248429 A1* | 9/2015 | Pregueiro | G06F 16/9577 715/202 |
| 2015/0347922 A1* | 12/2015 | Hamann | G06N 20/00 706/12 |
| 2016/0012106 A1* | 1/2016 | Franceschini | G06F 16/3344 707/728 |
| 2017/0132537 A1* | 5/2017 | Chavez | G06Q 40/06 707/710 |
| 2017/0228361 A1 | 8/2017 | Zhang et al. | |
| 2018/0330828 A1* | 11/2018 | Hayter, II | G16H 30/20 707/999.003 |

OTHER PUBLICATIONS

Disclosed Anonymously; "A process for using a stored semantic representation of a document, a Semantic Bookmark, to locate similar documents in the future"; ip.com; IP.com No. IPCOM000204102D; Published Feb. 11, 2011; pp. 14.

Disclosed Anonymously; "Automatic Transformation of Unstructured and Semi-structured Document Tables to Structured Relational Database Format"; ip.com; IP.com No. IPCOM000245463D; Publication Mar. 11, 2016; pp. 8.

Lawson, Daniel et al.; "An Introduction to Mathematical Modelling"; 2008; pp. 35.

\* cited by examiner

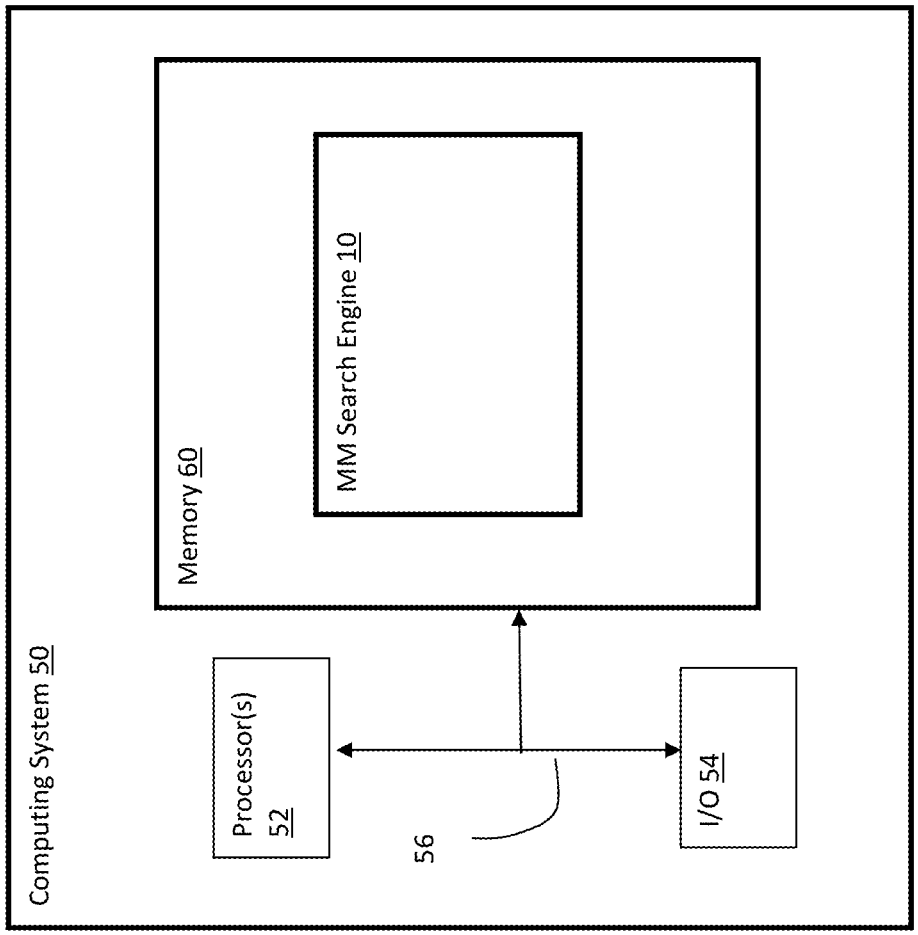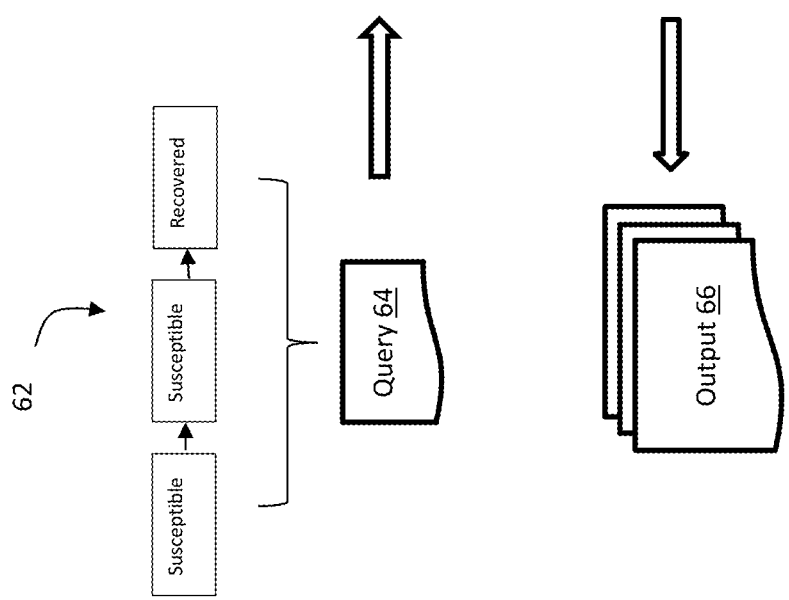
Figure 3

In our closed population of $N$ individuals, say that $S$ are susceptible, $I$ infected, and $R$ are removed. Write $s = S/N$, $i = I/N$, $r = R/N$ to denote the fraction in each compartment.

The SIR model is then:

$$\frac{ds}{dt} = -\beta s i \qquad (2)$$

$$\frac{di}{dt} = \beta s i - \nu i \qquad (3)$$

$$\frac{dr}{dt} = \nu i \qquad (4)$$

where $\beta = \tau\bar{c}$ and is known as the effective contact rate, $\nu$ is the removal rate. By assumption
$$s + i + r = 1$$

Assume that in the case study, an outbreak of influenza is considered within a hospital system, where N=1200.

Figure 4

Methods

Population and Model

We simulate the occurrence of influenza virus outbreaks in a typical Dutch long-term care nursing home department with 30 beds (in 15 two-bed rooms) and a team of 30 HCWs.

According to a standard model for infectious disease transmission, individuals can be in one of several stages of influenza virus infection: susceptible, infected but not yet infectious (exposed), infectious, or recovered/immune (S, E, I, or R) [11,12]. Susceptible individuals can be infected and become exposed through contact with infectious individuals Table 1. Parameter Values

| Parameter Type | Description | Value |
|---|---|---|
| Fixed | Number of beds (n) | 30 |
|  | Number of HCWs | 30 |
|  | Time step (=shift) | 8 |
|  | Minimum duration of simulation | 80 |
|  | Discharge/mortality rate | 1/425 |
|  | Rate of becoming infectious after infection | 1/1.4 |
|  | Infection recovery rate | 1/1.4 |
|  | Fraction of HCWs immune due to through cross-protection | 0.3 |
|  | Vaccine uptake patients | 0.75 |
|  | Probability of contact between patient-patient | 0.07 |
|  | Probability of contact between HCW-patient | 0.52 |
|  | Probability of contact between HCW-HCW | 0.91 |
|  | Probability of close contact between patient-patient | 0.06 |
|  | Probability of close contact between HCW-patient | 0.69 |
|  | Probability of close contact between HCW-HCW | 0.32 |
|  | Close/casual transmission probability ratio ($p_1/p_2$) | 2 |

Figure 5

We develop a spatial compartmental model based on the traditional susceptible-exposed-infectious-recovered (SEIR) equations, where each patch of algae population is represented by a spatial compartment. $S_i$, $E_i$, $I_i$, and $R_i$ representing the numbers of susceptible (capable of becoming infected), exposed (latently infected and incapable of transmitting infection), infectious (infectious individuals capable of transmission), and removed or dead individuals in the $i$th spatial compartment, respectively. Based on the model described above and the

Table 1
Parameter values used in the simulations

| Parameter | Value |
|---|---|
| Basic reproduction number ($R_0$) | 1.4 or 2 |
| Distance scaling factor ($r_0$) | 30 m |
| Incubation period ($1/\sigma$) | 2 day |
| Infectious period ($1/\gamma$) | 5 day |
| Initial infectious individuals | 1-28% |
| Total number of algae individuals | 900 |
| Number of clusters | 2-6 |
| Algae population of each cluster | 150-450 |
| Area of each cluster | 1,000 m² |
| Distance between clusters | 30-600 m |
| Time step | $10^{-3}$ day |

Figure 6

| Parameters | Value | Document |
|---|---|---|
| R0 | 1/1.4 | <link> |
| ν | 0.0238, 0.001 | <link>, <link2> |
| β | 0.06-0.91 | <link> |
| ... | ... | ... |

Figure 7

MECHANISTIC MATHEMATICAL MODEL SEARCH ENGINE

TECHNICAL FIELD

The subject matter of this invention relates to mechanistic mathematical models, and more particularly to a facility for searching for information associated with mechanistic mathematical models.

BACKGROUND

Mechanistic mathematical models (or simply mechanistic models) are often used in solving real-world problems across a variety of disciplines. Mechanistic models are based on an understanding of the behavior of a system's components, which differs from empirical model that are based on observations. For example, one can observe the change of the tides over many years, and construct an empirical model that allows you to predict when tides will occur, with no understanding of how the earth, moon and sun interact. Alternatively, one can also create a mathematical mechanistic model that uses the laws of physics to predict tides.

All mechanistic models have a number of parameters, which reflect real-world phenomena or "mechanisms." For example, in a pharmaceutical setting, a mechanistic model could be built with parameters that describe all the intermediate processes from a drug entering the system, to binding to receptors, modulating levels of hormones, and acting as a signal to the heart rate modulation system. Typically, such parameters may be time-varying, described using distributions, formulae, ranges, etc. For example, the distribution of life expectancy of a fish species as a function of water temperature may be a parameter in a mechanistic model involving the impact of global warming.

Selecting or identifying values of these parameters, and determining their distribution is crucial to modelling the real world scenarios effectively and conducting sensitivity and uncertainty analyses. In practice, determining the values and distributions of the model parameters are determined by a combination of historic information and expert advice. These approaches however raise issues such as uncertainty of trustworthiness, introduction of personal bias, and time-consuming research.

SUMMARY

Aspects of the disclosure provide a system and method to automate the process of searching for and selecting/identifying values and distributions of parameters for mechanistic models based on a contextual analysis of the available literature. By analyzing literature sources (e.g., text, tables, graphs, etc.), values and distributions of parameters for mechanistic mathematical models are derived and identified.

A first aspect discloses a mechanistic model search engine, comprising: a search interface for receiving input including text and functions relating to mechanistic models; a source interface for crawling online sources for mechanistic model information, wherein the information sources include text, tables, graphs, and functions; a context analysis system that determines parameter-based details from text information; a parameter processing system that derives parameter-based details from functions; and a search algorithm that compares parameter-based details determined from the input against parameter-based details determined from the information sources to identify mechanistic model search results.

A second aspect discloses a computer program product stored on a computer readable storage medium, which when executed by a computing system, provides a mechanistic model search engine, the program product including: program code for receiving input including text and functions relating to mechanistic models; program code for crawling online sources for mechanistic model information, wherein the information sources include text, tables, graphs, and functions; program code that determines parameter-based details from text information; program code that derives parameter-based details from functions; and program code that compares parameter-based details determined from the input against parameter-based details determined from the information sources to identify mechanistic model search results.

A third aspect discloses a computerized method for implementing a mechanistic mode search engine, comprising: receiving input including text and functions relating to mechanistic models; crawling online sources for mechanistic model information, wherein the information sources include text, tables, graphs, and functions; determining parameter-based details from text information; deriving parameter-based details from functions; and comparing parameter-based details determined from the input against parameter-based details determined from the information sources to identify mechanistic model search results.

BRIEF DESCRIPTION OF THE DRAWINGS

These and other features of this invention will be more readily understood from the following detailed description of the various aspects of the invention taken in conjunction with the accompanying drawings in which:

FIG. 3 shows a computing system having a mechanistic model search engine according to embodiments.

FIG. 4 depicts mechanistic model details for an SIR model according to embodiments.

FIG. 5 depicts an MM reference according to embodiments.

FIG. 6 depicts an MM reference according to embodiments.

FIG. 7 a search result output according to embodiments.

Figure 1:
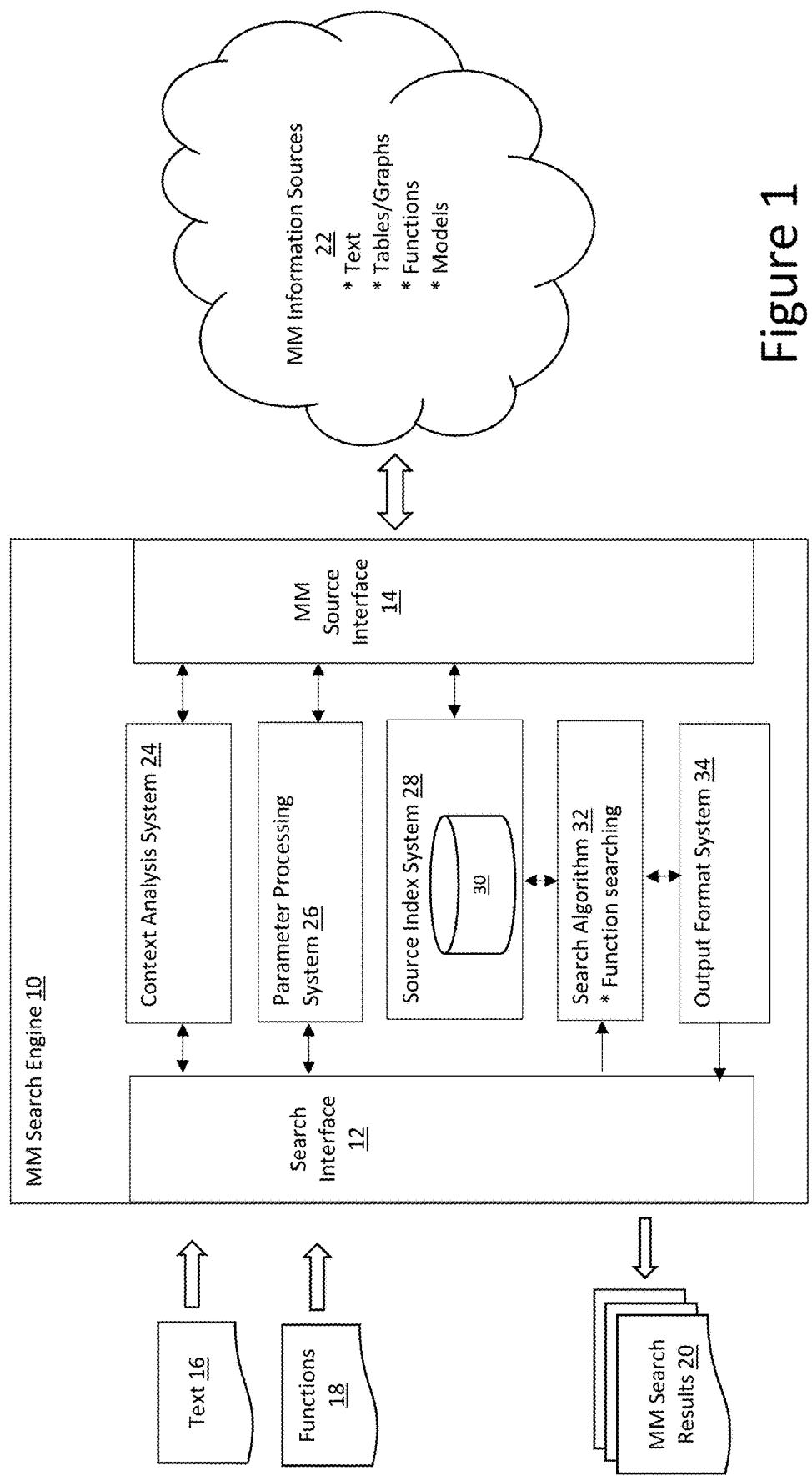
FIG. 1 shows a system diagram of a mechanistic model search engine according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a system diagram of a mechanistic model (MM) search engine 10 that receives MM related inputs including text 16 and/or functions 18, and outputs MM search results 20. Text 16 may for example comprise natural language inputs involving MM related matters such as "I am looking for parameter data associated with rising pollution levels in rivers of South America," or "I'm looking for parameter values associated with highway fatalities based on the time of day and vehicle age." Functions 18 may comprise any mathematical representation, including equations, models, etc., associated with mechanistic models. For example, the user may enter a disease spread model dS(t)/dt=−vP(t)S(t) in which S is the density of uninfected hosts, P is the density of virus-killed cadavers, t is time and v is the transmission parameter, and request a search for similar functions.

On the front end, search inputs 16, 18 and MM search results 20 are handled by a search interface 12. Search interface 12 may for example comprise any type of user interface, such as a graphical user interface, speech recognition, etc. Once search inputs 16, 18 are received, they are processed by content analysis system 24 and/or parameter identification system 26, which extracts parameter-based details that can be used by search algorithm 32 to identify relevant MM information sources.

On the back end, an MM source interface 14 periodically (or on demand) crawls for MM information sources 22, such as online literature, to locate text, tables and graphs, functions, models, etc. When an MM information source 22 is identified by the MM source interface 14, the source is similarly processed by content analysis system 24 and/or parameter identification system 26, and the parameter-based details are stored in an index 30 by source index system 28.

Context analysis system 24 analyzes terms, phrases, tables, graphs, images, etc., and determines a context of the model and associated parameters, including alternative names, interpretations, and categorization. For example, a table of parameter information located by MM source interface 14 may use the term "illness" to describe a parameter associated with meningitis rates, while a separately located graph may use the term "sickness" as a label to describe a similar parameter. Contextual analysis system 24 can be used to link or categorize both sources together. A similar analysis may be applied to variable names in functions, e.g., in which a first located function may utilize a single variable to describe something, while another located function may utilized a combination of variables to describe something similar. Based on the context, MM information sources 22 can be appropriately categorized and cross-referenced, e.g., in a taxonomy, and indexed.

A similar contextual process also occurs on the front end when a new search is entered. For example, when a text input 16 or function 18 is evaluated, the context is analyzed to determine terms, interpretations and formats that should be used by the search algorithm 32.

When analyzing functions 18 (either obtained via the search interface 12 or MM source interface 14), parameter values and/or distributions (i.e., parameter details) are derived by parameter processing system 26. In some cases, the parameter details can be determined directly from the function 18 itself. In other cases, the user could define parameter details in an inputted function 18, which could be used by the search algorithm 32. On the back end, the parameters of interest may appear in different forms in the MM information sources 22, e.g., as a function of a variable or as a combination of several variables of interest. Parameter processing system 26 can identify and consider different formats when processing a search.

Search algorithm 32 may utilize any search technique or approach for finding MM information sources 22. For example, search algorithm 32 may compare parameter-based detail determined from a search input with parameter-based details capture from MM information sources 22 to identify matches. In one further embodiment, the search algorithm 32 may be equipped to search for functions similar to in inputted function 18. For example, Symbolab™ provides a tool that searches for equations.

Once a set of search results are identified based on an inputted text 16 and/or function 18, output format system 34 is utilized to generate MM search results 20. Unlike traditional text based searching, the format and type of MM search results 20 can transform located information into different formats and presentations, depending on the user requirements. Illustrative output formats may for example include: parameter values, distribution of parameters, functions (including equations, models, etc.), and visualizations such as plots, tables, etc. In addition, confidence scores can be provided, such as a likelihood that a parameter of interest has a give value. Further, the original source of the information can also be provided (e.g., using a traditional hyperlink).

Figure 2:
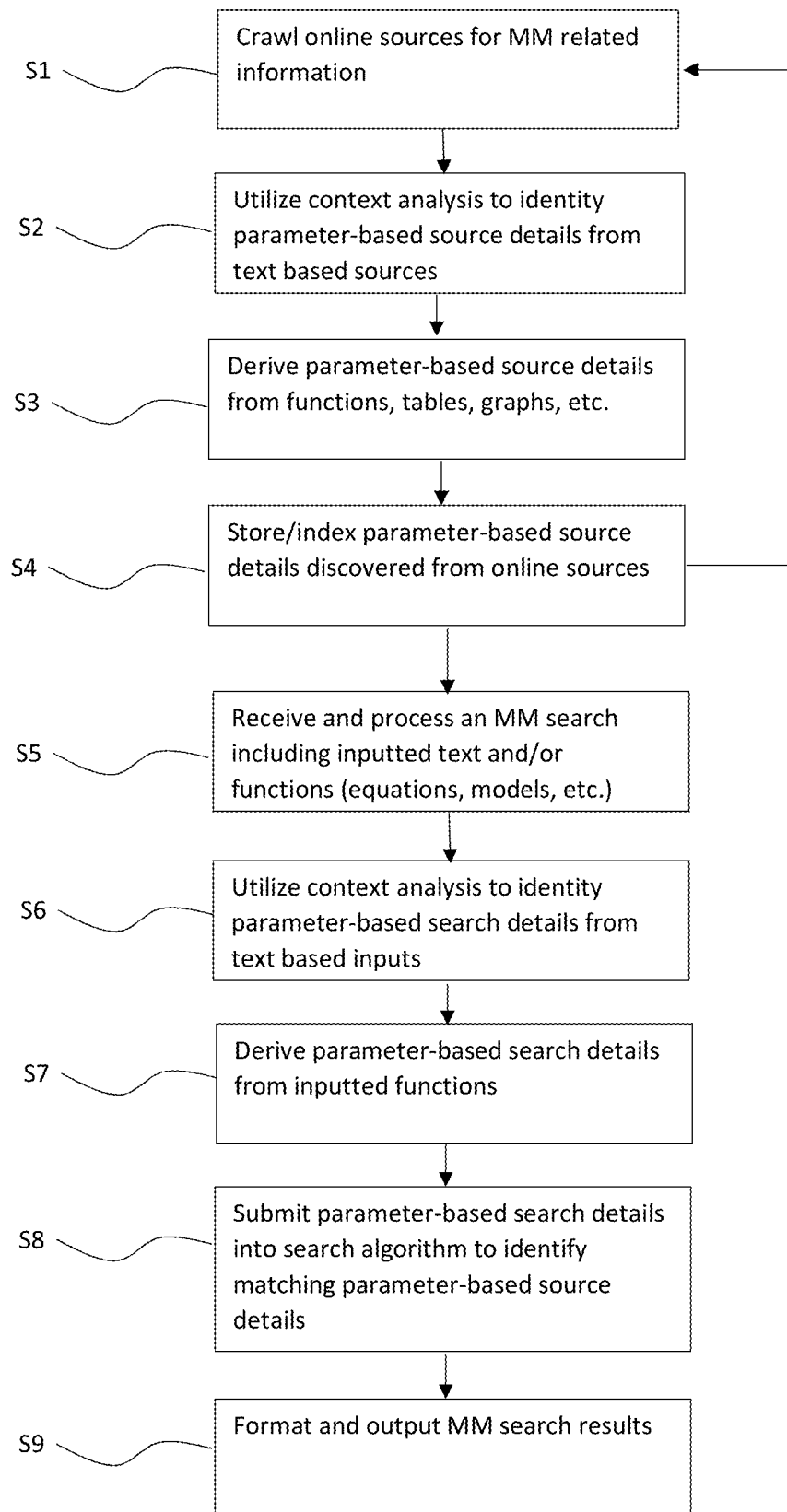
FIG. 2 shows a flow diagram of a method of implementing a mechanistic model search engine according to embodiments.

FIG. 2 depicts a flow diagram showing a process for implementing and utilizing MM search engine 10. At S1, online sources are crawled to locate MM related information, e.g., using known spider and web crawling technology. MM related information may be identified by analyzing the source (e.g., by searching for the terms such as "mechanistic model", using textual analysis, and/or other heuristics). Once an MM source is located, context analysis is applied to identify parameter-based source details from text based sources at S2. At S3, parameter-based source details are further derived from functions, tables, graphs, etc., and at S4, the parameter-based source details are stored and/or indexed. Steps S1-S4 repeat periodically or as needed according to a crawling strategy.

At S5, an MM search input is received by the MM search engine 10, including inputted text and/or functions (e.g., equations, models, etc.). At S6, context analysis is provided to identify parameter-based search details from the text based inputs and at S7, parameter-based search details are derived from inputted functions. Next, at S8, parameter-based search details are submitted to a search algorithm to identify matching parameter-based source details. Finally, at S9 the MM search results are formatted and output.

FIG. 3 depicts an illustrative computing system 50 for implementing MM search engine 10, in which information involving an SIR model 62 is sought. Based on the type of information sought, a query 64 is compiled an inputted. The query 64 may be in any format, any may for example allow the user to specify (e.g., with a drop down box) the specific type of information (i.e., output 66) sought. For example, the user may want parameter values, related equations, graphical data, sources, etc.

An SIR (susceptible, infectious, recovered) model 62 is a simple model of infectious diseases that are transmitted from human to human, and where recovery confers lasting resistance. The variables (S, I, and R) represent the number of people in each compartment at a particular time. For a specific disease in a specific population, each variable may be represented as a function that may be worked out in order to predict possible outbreaks and bring them under control.

Importantly, formal versions of these functions are dependent on the following known parameters:

1. How much do people make contact with each other (increases chance of spreading disease)?
2. How contagious is the disease?
3. How long does the infectious period of the disease last?

In this case, estimates for the parameters are required. Prior art approaches to locating such information involved manual searches of papers and/or text based web searching. In the current approach, information from the formal model (functions and linked text) are inputted as a query to find relevant estimates from the MM engine 10. FIG. 4 depicts an illustrative input that a user might enter that provides a subset of the formal model description. Note that the input query comprises natural language information that includes textual information and functions.

In order to take the input query and search online literature, both the formal description of the model being used and all of the documents to be searched need to be processed and indexed. For the inputted query, this would involve a variety of steps such as:

Parse the text into word—<"In", "our", "closed" "population", "of", "N", individuals", "Influenza" . . . >;
Extract symbols {N, S, I, R, s, i, r, ds/dt, . . . };
Extract relationships between symbols {N=S+I+R, ds/dt=−β×s×i, . . . }
Extract relationships between symbols and nearby words {N, "individuals"}, {S, "susceptible"}, {β, "effective contact rate"}; etc.

After analyzing the text and formulas, the context of the query (i.e., parameter-based details) could be stored in a data structure such as:

```
<Model Type> = SIR
    <Type> = Influenza
        <Location> = Hospital
        <Model Variables>
            <V1> N = 1200
            Etc.
        <Model Elements>
            <M1> ds/dt = −Bsi
            Etc.
```

FIG. 5 depicts a first located document describing parameter values for an outbreak of influenza in a Dutch hospital. Analysis of the text reveals that this document uses an expanded SIR model and presents information about the mortality rate (v). Accordingly, the parameter-based details of this document may have been contextually processed and indexed as:

```
<Model Type> = SIR
    <Model Category> = SEIR
        <Field> = Infectious Disease
            <Type> = Influenza
                <Location> = Dutch, Netherlands Hospital
                    <Parameters>
                        <P1> number of beds = 30
                        <P2> number of HCWs = 30
                        Etc.
```

Note that information from both the text and table are utilized to create a comprehensive context.

FIG. 6 depicts a second located document involving SIR related parameters. Although the model type and parameters appear relevant, an analysis of the associated text reveals that this model involves algae rather than for influenza. This document may have been contextually processed and indexed as:

```
<Model Type> = SIR
    <Model Category> = SEIR
        <Field> = Infectious Disease
            <Type> = Algae
                <Location> = Unknown
                    <Parameters>
                        <P1> Reproduction = 1.4 or 2
                        <P2> Distance Scaling Factor = 30m
                        Etc.
```

Once query and literature have been processed, standard information retrieval methods can be applied to locate and match relevant information. For example, fields from the data structures could be compared, weighted and scored. Because the information in the FIG. 5 document closely aligns with the input query, it would likely result in a match. Conversely, because the FIG. 6 document involves algae and not influenza, the search algorithm would yield a low score, indicating that the document does not result in a match.

FIG. 7 depicts an illustrative output based on discovered documents. In this case, discovered parameter values are output as a simple table. Alternatively, visualizations could be provided, including links to the source document, or graphs of discovered parameters etc.

It is understood that MM search engine 10 (FIG. 3) may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 50 that may comprise any type of computing device and for example includes at least one processor 52, memory 60, an input/output (I/O) 54 (e.g., one or more I/O interfaces and/or devices), and a communications pathway 56. In general, processor(s) 52 execute program code which is at least partially fixed in memory 60. While executing program code, processor(s) 52 can process data, which can result in reading and/or writing transformed data from/to memory and/or I/O 54 for further processing. The pathway 56 provides a communications link between each of the components in computing system 50. I/O 54 can comprise one or more human I/O devices, which enable a user to interact with computing system 50. Computing system 50 may also be implemented in a distributed manner such that different components reside in different physical locations.

Furthermore, it is understood that the MM search engine 10 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A computer system comprising:
   one or more computer processors,
   one or more computer readable storage media; and
   program instructions stored on the one or more computer readable storage media for execution by at least one of the one or more computer processors, the program instructions comprising:
   program instructions to receive input including text and functions relating to mechanistic models;
   program instructions to use a first contextual analysis of text information and identified parameter-based details from the received input as a search query, wherein the first contextual analysis comprises extracting symbols from function, relationships between symbols, and relationships between symbols and nearby words;
   program instructions to crawl online information sources for mechanistic model information independent of the search query, wherein the online information sources include text, tables, graphs, and functions;

program instructions to determine additional parameter-based details from the online information sources;

program instructions to compare, via a single search algorithm, parameter-based details determined from the input against parameter-based details determined from the online information sources to identify mechanistic model search results, wherein the mechanistic model search results include a set of functions similar to an inputted function; and program instructions to transform the mechanistic model search results into a single document filtering out portions of content from the mechanistic model search results with a score that indicates a low score and combining only portions of content from respective mechanistic model search results that includes parameters, functions, and visualizations that satisfy the generated search query.

2. The computer system of claim 1, wherein the functions include at least one of equations and models.

3. The computer system of claim 1, wherein the parameter-based details include variable names.

4. The computer system of claim 1, wherein the parameter-based details include parameter names.

5. The computer system of claim 1, wherein the mechanistic model search results include visualizations.

6. The computer system of claim 1, further comprising a source index system for indexing parameter-based details obtained from online sources of mechanistic model information.

7. A computer program product, the computer program product comprising:
one or more computer readable storage media; and
program code stored on the one or more computer readable storage media, the program code comprising:
program instructions to receive input including text and functions relating to mechanistic models;
program instructions to use a first contextual analysis of text information and identified parameter-based details from the received input as a search query, wherein the first contextual analysis comprises extracting symbols from function, relationships between symbols, and relationships between symbols and nearby words;
program instructions to crawl online information sources for mechanistic model information independent of the search query, wherein the online information sources include text, tables, graphs, and functions;
program instructions to determine additional parameter-based details from the online information sources;
program instructions to compare, via a single search algorithm, parameter-based details determined from the input against parameter-based details determined from the online information sources to identify mechanistic model search results, wherein the mechanistic model search results include a set of functions similar to an inputted function; and
program instructions to transform the mechanistic model search results into a single document filtering out portions of content from the mechanistic model search results with a score that indicates a low score and combining only portions of content from respective mechanistic model search results that includes parameters, functions, and visualizations that satisfy the generated search query.

8. The computer program product of claim 7, wherein the functions include at least one of equations and models.

9. The computer program product of claim 7, wherein the parameter-based details include variable names.

10. The computer program product of claim 7, wherein the parameter-based details include parameter names.

11. The computer program product of claim 7, wherein the mechanistic model search results include visualizations.

12. The computer program product of claim 7, further comprising program code for indexing parameter-based details obtained from online sources of mechanistic model information.

13. A computerized method for implementing a mechanistic mode search engine, comprising:
receiving input including text and functions relating to mechanistic models;
using a first contextual analysis of text information and identified parameter-based details from the received input as a search query, wherein the first contextual analysis comprises extracting symbols from function, relationships between symbols, and relationships between symbols and nearby words;
crawling online information sources for mechanistic model information independent of the search query, wherein the online information sources include text, tables, graphs, and functions;
comparing, via a single search algorithm, parameter-based details determined from the input against parameter-based details determined from the information sources to identify mechanistic model search results, wherein the mechanistic model search results include a set of functions similar to an inputted function; and
transforming the mechanistic model search results into a single document by filtering out portions of content from the mechanistic model search results with a score that indicates a low score and combining only portions of content from respective mechanistic model search results that includes parameters, functions, and visualizations that satisfy the generated search query.

14. The method of claim 13, wherein the functions include at least one of equations and models.

15. The method of claim 13, wherein the parameter-based details include variable names.

16. The method of claim 13, wherein the parameter-based details include parameter names.

17. The method of claim 13, wherein the mechanistic model search results include visualizations.

* * * * *